United States Patent [19]

Copeland, III et al.

[11] Patent Number: 5,784,610
[45] Date of Patent: Jul. 21, 1998

[54] CHECK IMAGE DISTRIBUTION AND PROCESSING SYSTEM AND METHOD

[75] Inventors: John Ray Copeland, III, Decatur, Ala.; Leslie Marie Doby, Matthews, N.C.; Larry Page Hobbs, Jr., Charlotte, N.C.; Vil Patrick Johnikin, Charlotte, N.C.; Julie Ann Pridmore, Charlotte, N.C.; Sterling Richardson Smith, Charlotte, N.C.; Thomas Chester Smith, Charlotte, N.C.; Lori London Weaver, Salisbury, N.C.; Filip Jay Yeskel, Charlotte, N.C.

[73] Assignee: International Business Machines Corporation, Armon, N.Y.

[21] Appl. No.: 342,978

[22] Filed: Nov. 21, 1994

[51] Int. Cl.[6] .................. G06F 15/00; G06F 17/30
[52] U.S. Cl. .................. 395/615; 395/610; 364/963; 364/918.2
[58] Field of Search .................. 395/145, 146, 395/149, 600, 650, 732, 109, 110, 620, 611, 615, 792, 610; 382/135, 137; 364/400, 413.19, 413.22, 918.2, 963, 918, 962

[56] References Cited

U.S. PATENT DOCUMENTS

| | | | |
|---|---|---|---|
| 4,888,812 | 12/1989 | Dinan et al. | 382/140 |
| 4,941,125 | 7/1990 | Boyne | 395/615 |
| 5,120,944 | 6/1992 | Kern et al. | 235/379 |
| 5,170,466 | 12/1992 | Rogan et al. | 395/792 |
| 5,187,750 | 2/1993 | Behra | 382/140 |
| 5,287,497 | 2/1994 | Behera | 395/615 |
| 5,301,350 | 4/1994 | Rogan et al. | 395/800 |
| 5,321,816 | 6/1994 | Rogan et al. | 395/200 |

Primary Examiner—Wayne Amsbury
Assistant Examiner—Greta L. Robinson
Attorney, Agent, or Firm—Kenneth A. Seaman

[57] ABSTRACT

A digital document image archive and distribution system includes an archive system and a distributed digital document image retrieval system. The system has communication nodes located at an image capture site and at one or more remote archive retrieval sites, these sites forming a communications network operating as a chained client/server network composed of workstation components and a capture site host computer component. An originating remote workstation retrieves a digital document image from the image capture site by creating a transaction file that identifies a digital document image to be retrieved. This transaction file is sent to a remote server workstation whereat a plurality of transaction files are batched by priority. The batched transaction files are transmitted to the capture site workstation whereat the host component retrieves a group of digital document images from archive storage, including the digital document image that is identified by the transaction file. The host then sends the group of digital document images to a capture site server workstation, which workstation then sends the group of digital document images from the capture site server workstation to the remote server workstation, whereupon the group of digital document images is sent from the remote server workstation to the originating remote workstation. A visual display is then used to image process the group of digital document images at the originating remote workstation.

16 Claims, 32 Drawing Sheets

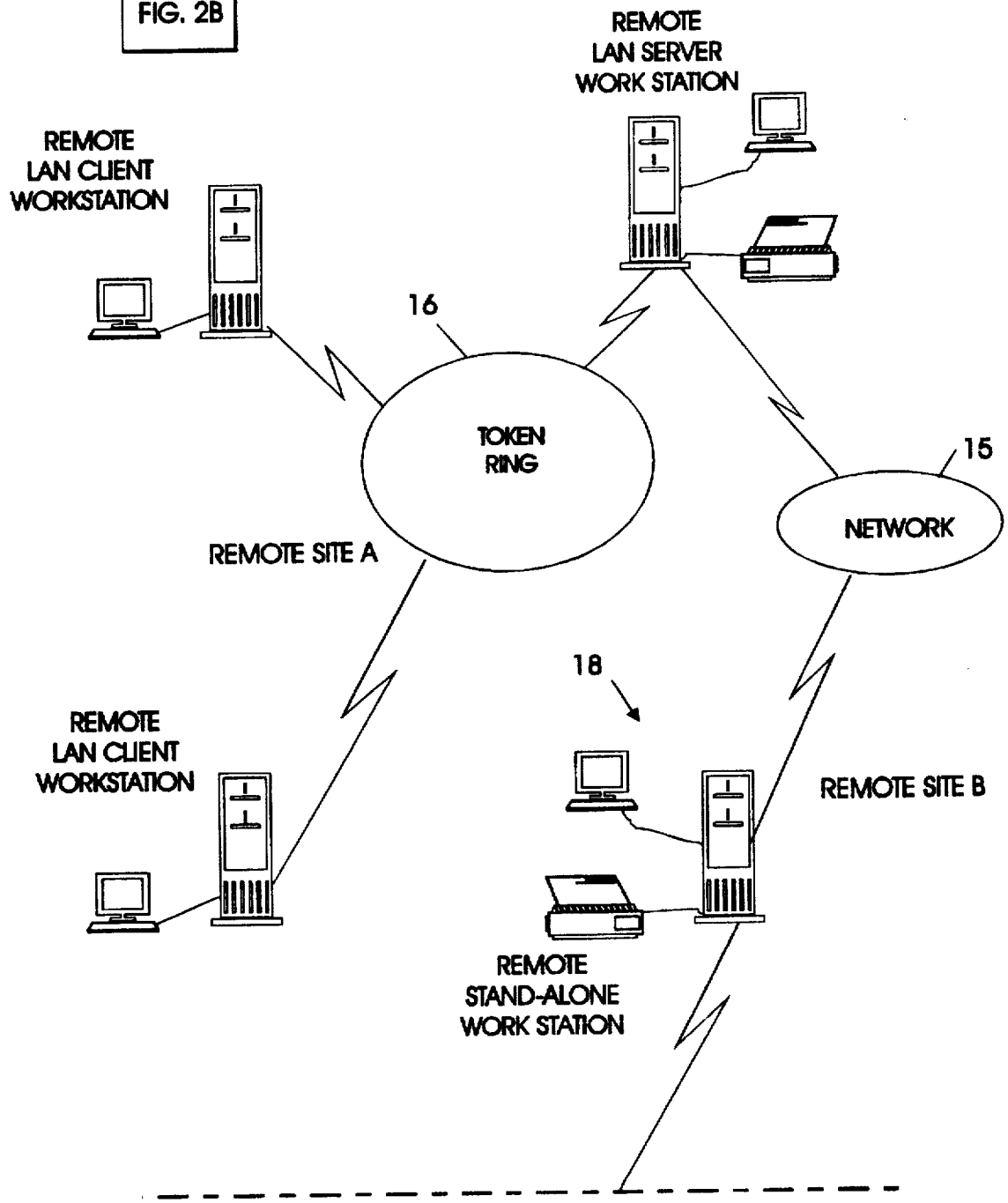

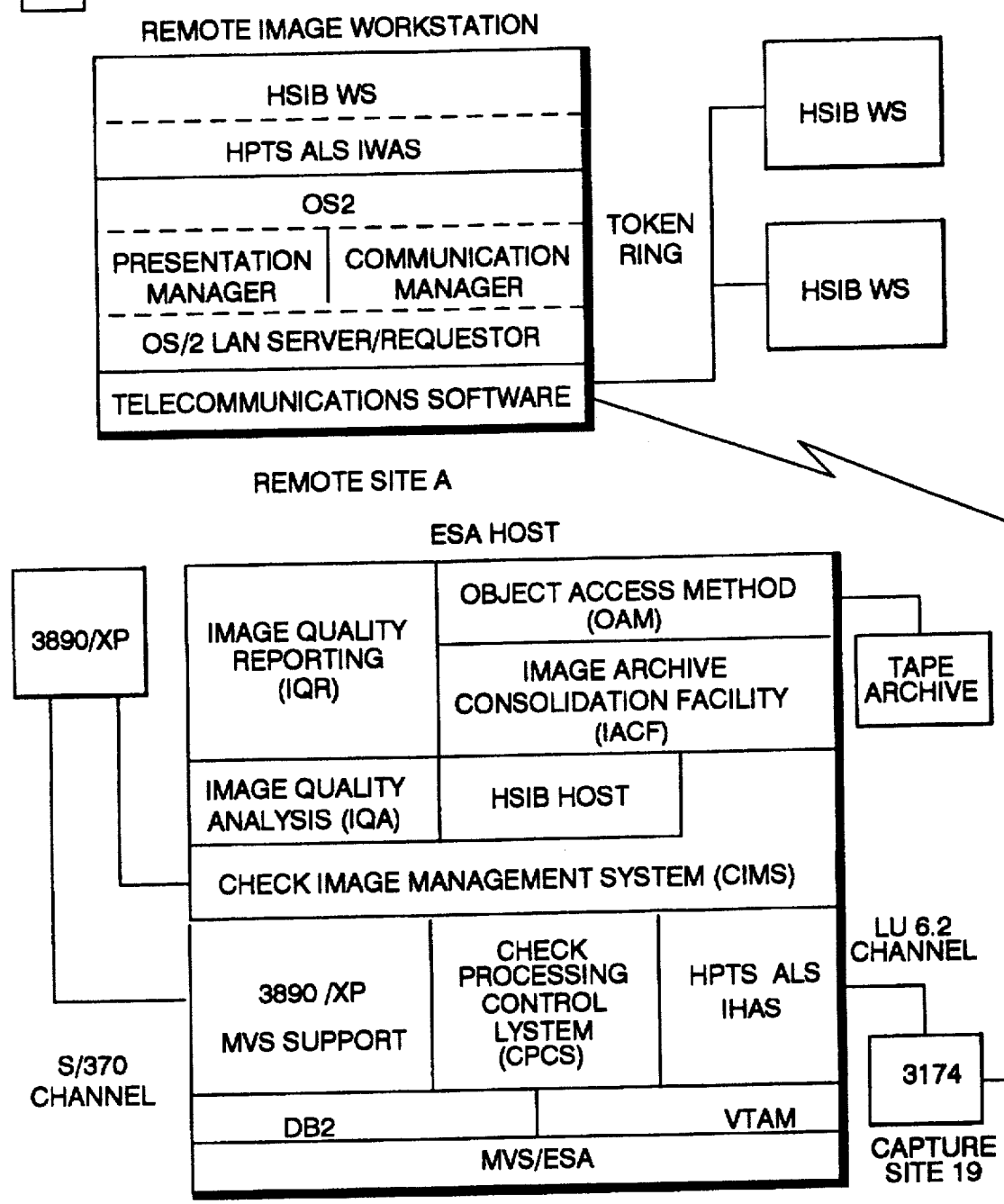

FIG. 3B
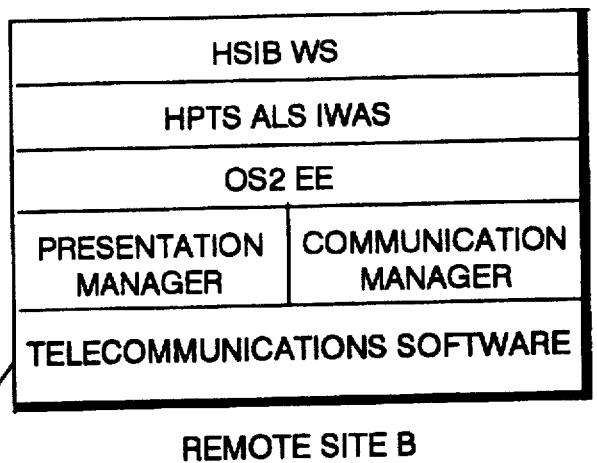
REMOTE HSIB WORKSTATION
| HSIB WS |  |
|---|---|
| HPTS ALS IWAS |  |
| OS2 EE |  |
| PRESENTATION MANAGER | COMMUNICATION MANAGER |
| TELECOMMUNICATIONS SOFTWARE | |
REMOTE SITE B
15 NETWORK
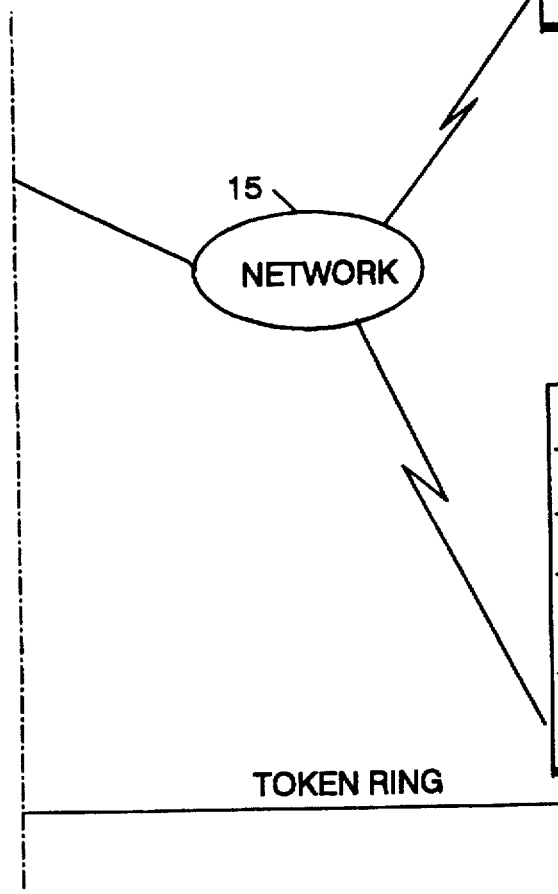
CAPTURE SITE HSIB WORKSTATION
| HSIB (WS- CAPTURE SITE) | |
|---|---|
| HPTS ALS IWAS | |
| OS2 | |
| PRESENTATION MANAGER | COMMUNICATION MANAGER |
| COMMUNICATIONS DRIVERS | |
TOKEN RING

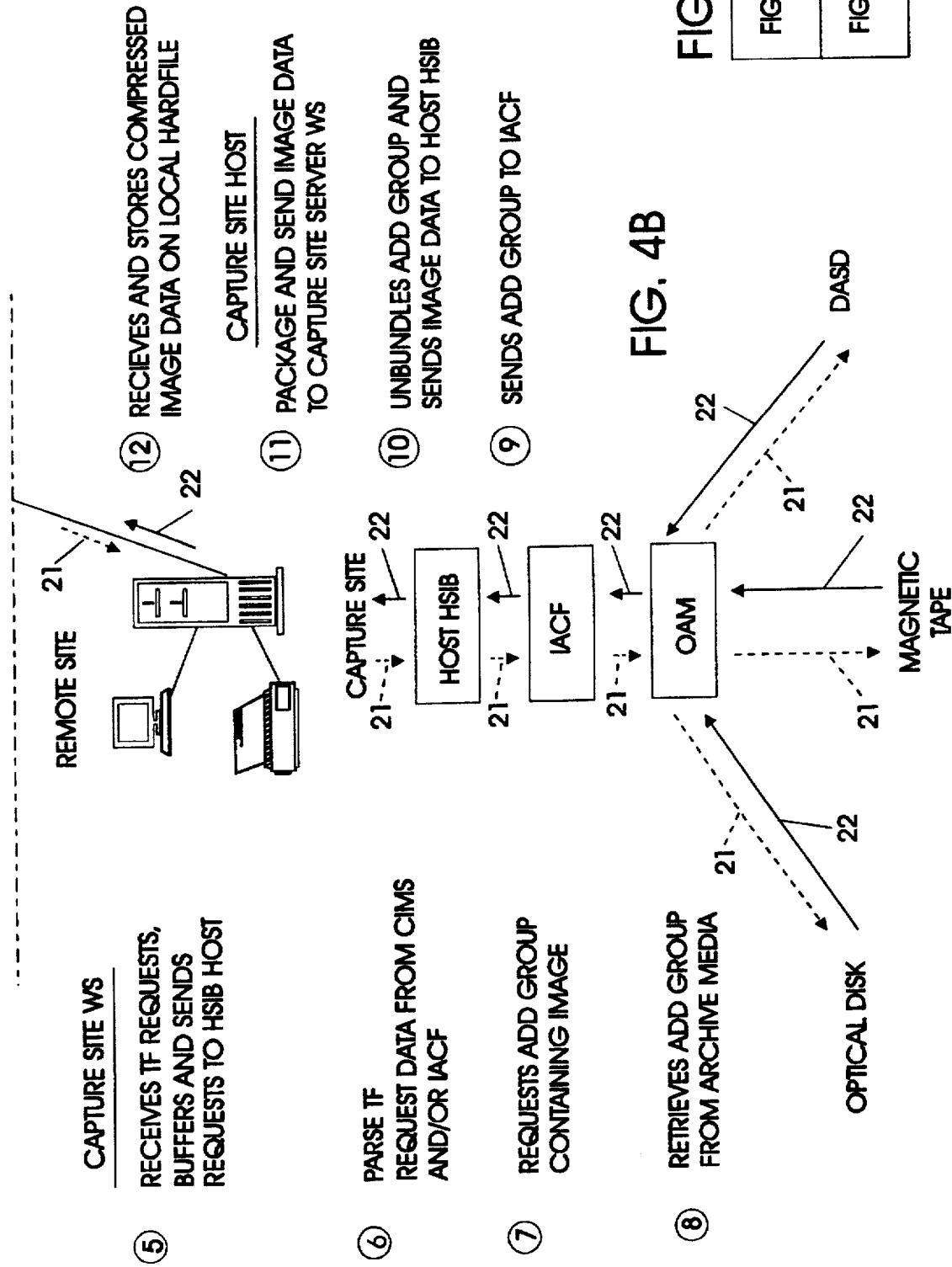

FIG. 9A

| Data Element Name | Notes | |
|---|---|---|
| | | HSIB/FR Workstation |
| Retrieval Priority (One per transaction) | Specifies Immediate or Batch. | Originates via default, or operator entry.<br><br>All TFs, regardless of priority value are transferred to LAN Server workstation. |

FIG. 9B

| Image Archive System Component Usage | | |
|---|---|---|
| LAN Server HSIB/FR Workstation | Capture Site HSIB/FR Workstation | HSIB/FR Host |
| Originates only if this workstation is originating the request, and if so, by default or operator entry.<br><br>Batch priority TFs are accumulated until file transfer conditions are met. Once met, they are sent to the File Transfer Program for transmission to capture site workstation.<br><br>Immediate priority TFs files are Immediately sent to the File Transfer Program for transmission to capture site workstation. | Originates only if this workstation is originating the request, and if so, by default or operator entry.<br><br>Accumulates Batch and Immediate TFs sepArately, whether originated locally or at a remote site. One TF from each group is sent to the host in a FIFO manner.<br><br>Image reply data associated with Batch priority TFs is accumulated until file transfer conditions are met. Once met, they are sent to the File Transfer Program for transmission to the requesting LAN Server workstation. | Immediate TF takes precedence for service over a Batch TF when images are archived. Otherwise, it is first come first serve. |

| | | |
|---|---|---|
| Transaction File Id (One per transaction) | Uniquely identifies this file as a transaction file. | Originates at TB creation time as a program default. |
| Worksheet ID (One per transaction) | Uniquely identifies the originating workstation. | Originates at TB creation time as a program default. |
| LAN Server ID (One per transaction) | Uniquely identifies the LAN Server HSIB workstation servicing the workstation identified above. | Originates at TB creation time as a program default. |
| Operator ID (One per transaction) | Uniquely identifies the originating operator. | Originates at TB creation time as a program default, or by operator entry. |

FIG. 9C

| Originates only if this workstation is originating the request, and if so, by program default. | Originates only if this workstation is originating the request, and if so, by program default. | |
| --- | --- | --- |
| Originates only if this workstation is originating the request, and if so, by program default. | Originates only if this workstation is originating the request, and if so, by program default. | |
| Originates only if this workstation is originating the request, and if so, by program default. | Originates only if this workstation is originating the request, and if so, by program default. | |
| Originates only if this workstation is originating the request, and if so, by default or operator entry. | Originates only if this workstation is originating the request, and if so, by default or operator entry. | |

FIG. 9D

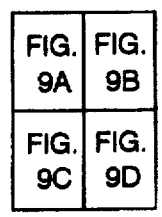

| FIG. 9A | FIG. 9B |
| --- | --- |
| FIG. 9C | FIG. 9D |

| Data Element Name | Notes | |
| --- | --- | --- |
| | | HSIB/FR Workstation |
| Transaction File Status (One field per transaction) | This field is updated by each component in the system that processes the transaction file. | 1. Updates (originates) when TF is created<br><br>2. Updates when TF is made available to LAN Server HSIB 3.0 workstation |

FIG. 10B

| Image Archive System Component Usage | | |
|---|---|---|
| LAN Server HSIB/FR Workstation | Capture Site HSIB/FR Workstation | HSIB/FR Host |
| 1. Updates (originates) when TF is created<br><br>2. Updates when TF is made available to File Transfer program<br><br>3. Updates when a response has been received for some requested data.<br><br>4. Updates when a response has been received for all requested data. | 1. Updates (originates) when TF is created<br><br>2. Updates when TF is received from File Transfer Program<br><br>3. Updates when TF is sent to Host HSIB 3.0<br><br>4. Updates when partial reply data has been received from Host HSIB 3.0<br><br>5. Updates when complete reply data has been sent to File Transfer Program for transmission back to LAN Server workstation. | 1. Updates when TF has been received from Capture Site HSIB 3.0 Workstation.<br><br>2. Updates when TF request contents have been made available to CIMS and/or IACF<br><br>3. Updates when all available requested data has been received from CIMS and/or IACF<br><br>4. Updates when all available requested data has been sent to Capture Site HSIB 3.0 Workstation |

| | | |
|---|---|---|
| Request Type (One per transaction) | Indicates the type of processing requested for this transaction file. Valid values are:<br>• Image Request (0)<br>• Local Status Request (1)<br>• System Status Request (2)<br>• Suspect Review Process (3)<br>• Decompress Images (4)<br>• Display Images (5)<br>• Save Locally (6)<br>• Discard (7)<br>• Acknowledge (8) | Originates via operator entry, or processing results. |
| Request Date and Time (One per transaction) | Indicates the date and time the transaction file originated. | Originates via default. |
| Numerator Scale (One per transaction) | Indicates the numerator scaling factor. Currently a value of one is the only valid value. | Originates via default. |

FIG. 10C

| Originates via operator entry, or processing results if this workstation creats the TF. | Originates via operator entry, or processing results if this workstation creats the TF. | |
|---|---|---|
| Originates via default, if this workstation creats the TF. | Originates via default, if this workstation creats the TF. | |
| Originates via default, if this workstation creats the TF. | Originates via default, if this workstation creats the TF. | |

FIG. 10D

| FIG. 10A | FIG. 10B |
|---|---|
| FIG. 10C | FIG. 10D |

| Data Element Name | Notes | HSIB/FR Workstation |
|---|---|---|
| Requested Data Processing (One set of these fields for each transaction)<br><br>• Compression format (Compressed or Decompressed)<br>• Use IBM 3898 IP to decompress/scale (Y/N)<br>• Image Decompression or Scale in Server (Y/N)<br>• Image View Denominator Scaling factor (1,2,3) | Specifies whether image decompression desired.<br><br>Specifies<br>1. location of image decompression/ scaling:<br>   • IBM 3898 IP<br>   • LAN Server workstation<br>2. Denominator scaling factor (if any) to be used for decompression of image data | Originates via default, or operator entry.<br><br>If image Decompression at Server flag is N, the requesting HSIB workstation is responsible for decompression and scaling returned images. |
| Tranaction File Size (One per transaction) | Specifies the total size, in bytes, of the entire TF. | Originates if this workstation creates the TF. |
| Tranaction File Name (One per transaction) | Unique name given to identify the TF. | Originates via default, or operator entry if this workstation creates the TF. |

FIG. 11B

| Image Archive System Component Usage | | |
|---|---|---|
| LAN Server HSIB/FR Workstation | Capture Site HSIB/FR Workstation | HSIB/FR Host |
| Originates via default, or operator entry if this workstation creates the TF.<br><br>If the image Decompression Server flag is set Y, this workstation will automatically decompress and scale returned images.<br><br>Decompressed images are stored in a separate library. | Originates via default, or operator entry if this workstation creates the TF.<br><br>If the IBM 3898 IP is not selected and decompress and scale options for image requests originating at this workstation are chosen, this workstation is responsible for decompressing and scailing images. | If the IBM 3898 IP is selected, images are routed through the IP, otherwise, Images are routed directly to the HSIB Capture site workstation. |
| Originates if this workstation creates the TF. | Originates if this workstation creates the TF. | |
| Originates via default, or operator entry if this workstation creates the TF. | Originates via default, or operator entry if this workstation creates the TF. | |

| | | |
|---|---|---|
| Request Array Count (One per transaction) | Request Array is used to identify the number of UOWs associated with this TF. Only one UOW is listed per request array. If no UOWs are associated with this TF, the default number of request arrays is one. | Originates via default, if this workstation creates the TF. |
| Request Array length (One per transaction) | Specific size, in bytes, of one request array structure. | Originates via default, if this workstation creates the TF. |
| Unit of Work (UoW)ID (One or more per transaction) | CPCS UOW string ID or blank. | Originates by operator entry, if this workstation creates the TF. |
| Image Quality Analisis Results (One or more per transaction) | A value of R for Rejected or C for Conditionally Accepted. The R and C values are the quaility analysis results on the specified UoW ID. | |

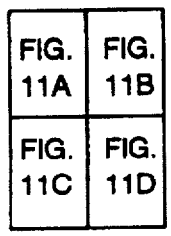

| Originates via default, if this workstation creates the TF. | Originates via default, if this workstation creates the TF. | |
|---|---|---|
| Originates via default, if this workstation creates the TF. | Originates via default, if this workstation creates the TF. | |
| Originates by operator entry, if this workstation creates the TF. | Originates by operator entry, if this workstation creates the TF. | Supplied, if any requesting workstation specified next available UoW for Suspect Review Processing. |
| | | Originated here if any requesting workstation specifies Suspect Review Processing. |

| Data Element Name | Notes | |
|---|---|---|
| | | HSIB/FR Workstation |
| UoW Suspect Overflow Flag (One or more per transaction) | If value is set, there are more suspect documents ID associated with this TF's UoWID than those listed in the TF. | |
| Document ID Count (One or more per transaction) | Total number of documents requested by this TF. | Originates here if this workstation created TF. |
| Document ID Return Count (One or more per transaction) | Total number of documents returned by the Host system associated with this TF. | |
| UoW Document Count (One or more per transaction) | Total number of documents captured within this UoW. | |

FIG. 12B

| Image Archive System Component Usage | | |
|---|---|---|
| LAN Server HSIB/FR Workstation | Capture Site HSIB/FR Workstation | HSIB/FR Host |
| | | Originated here if any requesting workstation specifies Suspect Review Processing and not able to send back all suspect document ID within TF. |
| Originates here if this workstation created TF. | Originates here if this workstation created TF. | Originates here if any requesting workstation specifies Suspect Review Processing. |
| Originates and is updated by this workstation as it receives images via File Transfer Program. | Originates and is updated by this workstation as it receives image reply data from the host system, only if this workstation was the one that requested the images. | |
| | | Originates here if any requesting workstation specified Suspect Review Processing. |

| Display First ID | Specifies which documents ID within the TF to display first. | Originated by operator entry, if TF created by this workstation. |
|---|---|---|
| Document ID (One or more per transaction) | Uniquely identifies a document for which data is being requested. | Originates via operator entry, or 3270 screen capture if this workstation creates the TF. |
| Image Key (One per Document ID) | Unique HPTS 44 byte image key identifying the images associated with a document. May originate either on HSIB workstation or HSIB host (via HSIB host user exit). | Originates via user exit if this workstation creates the TF. |
| Requested Data Type (One set of flags for all Document ID)<br>• Front B/W (Y/N)<br>• Front Grey (Y/N)<br>• Back B/W (Y/N)<br>• Back Grey (Y/N)<br>• CIMS Segment O (Y/N)<br>• Auxillary user data (Y/N) | Specify which data is requested for a the group of documents:<br>• Any or all supported image views<br>• CIMS segment O data<br>• Auxiliary user data (provided via IACF user exit) | Originates via default or operator entry if this workstation creates the TF. |

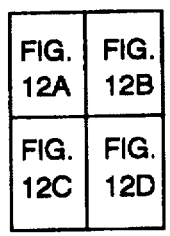

| Originates by operator entry, if TF created by this workstation. | Originated by operator entry, if TF created by this workstation. | |
|---|---|---|
| Originates via operator entry, or 3270 screen capture if this workstation creates the TF. | Originates via operator entry, or 3270 screen capture if this workstation creates the TF. | Originates here if any requesting workstation specified Suspect Review Processing. |
| Originates via user exit if this workstation creates the TF. | Originates via user exit if this workstation creates the TF. | May originate via user exit |
| If this workstation creates the TF. | If this workstation creates the TF. | |

| Data Element Name | Notes | HSIB/FR Workstation |
|---|---|---|
| Requested Document Status (one field for each Document ID) | The status field will indicates at least:<br>• results (if any) of the action | |
| Raply Data File(s) (one field for each Document ID) | Contains the FAT file name and path for the file containing the document data. | Originates via defaults or operator entry if workstation creates TF |

FIG. 13B

| Image Archive System Component Usage | | |
|---|---|---|
| LAN Server HSIB/FR Workstation | Capture Site HSIB/FR Workstation | HSIB/FR Host |
| Updates when image reply data has been decompressed (if Server decompressed has been requested) | | 1. Updates when reply data is received from CIMS and/or IACF<br>2. Updates when reply data has been sent to Capture Site HSIB Workstation. |
| Originates via defaults or operator entry if workstation creates TF | Originates via defaults or operator entry if workstation creates TF | |

| Segment View Returned (six fields for each Document ID) | Total Number of segment views returned. | |
|---|---|---|
| Relative Document DI (one per Document ID) | Relative placement number of DI within TF. | Originates based on placment within TF if this workstation creates the TF. |
| Document Type (one per Document ID) | Identifies the type of document. Possible choices are:<br>• Base - Requested Document ID<br>• FWD - A Forward ancillary document based off of last known base ID<br>• Bck - A Backward ancillary document based off of last known base ID | Originates based on user supplied defaults if this workstation creates the TF. |
| Document Suspiciousness Value (one per Document ID) | Results of image quality analysis for this document. | |

FIG. 13C

| FIG. 13A | FIG. 13B |
|---|---|
| FIG. 13C | FIG. 13D |

FIG. 13

| | Originated and updated for each segment view returned of a particular document requested from the host system. | |
|---|---|---|
| Originates Based on placment within TF if this workstation creates the TF. | Originates Based on placment within TF if this workstation creates the TF. | |
| Originates based on user supplied defaults if this workstation creates the TF. | Originates based on user supplied defaults if this workstation creates the TF. | |
| | | Originates based on results of image quality analysis. |

TRANSACTION FILE CONTENTS AND USAGE

| Data Element Name | Notes | Image Archive System Component Usage ||||
|---|---|---|---|---|---|
| | | HSIB/FR Workstation | LAN Server HSIB/FR Workstation | Capture Site HSIB/FR Workstation | HSIB/FR Host |
| ...Image Suspiciousness Value (four per document ID) | Results of image quality analysis for this document view. | | | | Originates based on results of image quality analysis. |

CHECK IMAGE DISTRIBUTION AND PROCESSING SYSTEM AND METHOD

CROSS-REFERENCES TO RELATED APPLICATIONS

This invention relates to the following patent applications which are incorporated herein by reference.

U.S. patent application Ser. No. 09/209,096, filed Mar. 10, 1994, entitled "High Volume Document Image Archive System and Method".

U.S. patent application Ser. No. 08/222,198, filed Mar. 1, 1994, entitled "Method and System for Retrieving and Presenting Stored Digital Images" now abandoned.

U.S. patent application Ser. No. 08/195,728, filed Feb. 14, 1994, entitled "Image Quality Analysis Method and Apparatus" now abandoned.

BACKGROUND OF THE INVENTION

1. Field of the Invention

This invention pertains generally to the field of high speed processing of documents such as checks so as to produce digital images thereof, these images then being archived for later retrieval. More specifically this invention relates to a distribution system for making these check images available to a variety of geographically distributed users.

2. Description of the Related Art

The use of a computer based image processing system or architecture to scan documents such as checks and the like, and to then digitally store the results on mass storage devices is generally known in the art.

U.S. Pat. No. 4,888,812, incorporated herein by reference, discloses such a check processing system that is based upon an IBM 3890 high speed document reader/sorter wherein features such as feeding checks to an image scanner, monitoring image quality and possibly interrupting the process as a result of poor image quality, image data compression, image resolution control, parallel processing of image data, and storage of check images on both high speed and low speed mass storage devices such as magnetic storage and optical storage are provided.

U.S. Pat. No. 4,941,125, incorporated herein by reference, describes an information storage and retrieval system wherein a digital camera scans documents to form video images. A data processor generates index information corresponding thereto. The video images and the corresponding index information are stored on different areas of optical media. The index information is generated by the use of self-index software that is responsive to text, and manually by the use of a keyboard. Remote location access is provided.

U.S. Pat. No. 5,170,466, incorporated herein by reference, discloses a storage/retrieval system wherein documents such as checks are scanned, digitized, compressed and stored in archival modules. The stored documents can then be retrieved and processed by workstation operators.

U.S. Pat. No. 5,187,750, incorporated herein by reference, discloses a checking account document processing, archival magnetic/optical storage, and printout system having image capture and image retrieval functions.

A core element of the business of most financial institutions is the distribution of information regarding financial transactions to their customers. Most large banks, for example, routinely distribute information about check based transactions to their commercial and retail customers, as well as to other processing functions within the bank.

For retail customers, this information distribution service typically takes the form of periodic checking account "statements". For commercial customers, similar but more sophisticated services fall under the heading of "cash management" or "treasury" services. Within the bank, this same information may be used for bank processes typically referred to generically as "back office", and include check research and adjustments, exception processing, incoming and outgoing return items, and others.

With two exceptions, these services today typically supply either the physical checks, and/or a coded data (i.e., numbers and text) representation of the important information on the check, to their end users. The two exceptions are check image statements and microfilm copies. In the former case, customers receive printed copies of digitally captured check images. In the latter case, customers receive printed copies of photographically captured check images. In both cases, the delivery vehicle for the check image data is still physical, i.e., not electronic.

The use of computer networks to distribute electronic information is well known in the art. Banks today use such networks to deliver coded check data to internal and external users for the purposes described above. These networks, and particularly the coded data delivery applications that use them, are poorly suited to deliver digital image information. Bandwidth, response, and general application functions are not designed for digital image handling.

Nevertheless, the financial institution's internal and external customers often have a need for non-coded other information about the check that can only be obtained from the physical document or its image. As a result, financial institutions are generally required to maintain archives of financial documents and related data for several years.

Typically these archives are maintained using the original documents and/or microfilm images of the documents. Check "image" information from these archives is today typically delivered physically, i.e., as original paper or microfilm copies, via delivery methods that are necessarily outside or peripheral to the electronic distribution mechanisms for coded check data.

The referenced related patent applications describe some of the advantages of using image technology to create and maintain such check image archives. The need remains however for a method and apparatus to access this archives distribute this check image data electronically to end users, and allow them to optimally use the information.

These users are geographically distributed, so there is a need to support check image distribution via telecommunications. Some users will have high bandwidth communications channels already available and others will have only an ordinary dial telephone, so there is a need to support distribution over any communications carrier and protocol. These users are typically unsophisticated, so there is a need for fully automated, background operation that makes the operation of the check image distribution system unknown to the end users. Finally, there is a need for end users to be able to manipulate the distributed check images in a manner that makes optimum use of the capabilities of image technology and provides maximum ease of use.

SUMMARY OF THE INVENTION

The present invention provides a check image distribution and processing subsystem for use with an archive subsystem wherein an archive of documents is stored in digital form. A geographically distributed information network comprises a plurality of client/server workstation nodes that are operable to selectively receive or send files throughout the network. Each of the nodes includes means causing the nodes to operate in an idle mode of operation until a node receives either a request to receive an incoming file or a request to send an outgoing file. The nodes respond to a request to receive an incoming file and then switch to a receive mode of operation whereupon the node verifies that a requesting network node is a valid network node prior to receiving and storing files from the requesting node. The nodes respond to a request to send an outgoing file and then switch to a send mode of operation, whereupon a requested file is transferred to a requesting node.

As a feature of the invention, a common file receive/send protocol operates between a plurality of client/server workstation nodes.

As an additional feature of the invention, each client/server workstation node includes disk storage for storing files and responds to a "full storage" condition of the disk storage, whereupon workstation operation in the receive mode of operation is disabled, and a problem is indicated at a workstation console display.

As a further feature of the invention, each client/server workstation node includes means for identifying a desired starting file image to be retrieved from disk storage and displayed on a workstation console display, means for retrieving the starting file image from disk storage for viewing by an operator and for displaying the starting file image on the console display, and control means enabling an operator to control the direction and speed to sequentially move through file images stored in disk storage from the starting file image.

An object of the invention is to provide an image distribution and processing system which can access an image archive system, the distribution system having communication nodes located at an image capture site of the archive system and at one or more remote archive retrieval sites, the sites forming a communications network operating as a chained client/server network that is composed of workstation components and host computer components. A geographically distributed information network comprises at least one capture site client/server workstation node and plurality of remote site client/server workstation nodes, all of nodes being operable to selectively receive or send files throughout the network. Each of the nodes has means to operate in an idle mode of operation until a node receives either a request to receive an incoming file or a request to send an outgoing file. Each of the nodes has means responsive to a request to receive an incoming file causing the node to switch to a receive mode of operation, whereupon the node verifies that a requesting network node is a valid network node prior to receiving and storing files from the requesting node. Each of the nodes has means responsive to a request to send outgoing file(s) causing the node to switch from an idle mode of operation to a send mode of operation, whereupon file(s) is(are) transferred. A common file receive/send protocol operates between at least one capture site client/server workstation node and a plurality of remote site client/server workstation nodes, the capture site client/server workstation node and the plurality of remote site client/server workstation nodes including disk storage for storing files and means responsive to a full disk storage condition of the disk storage, whereupon workstation operation in the receive mode of operation is disabled and the full disk storage problem is indicated at a workstation console display.

In accordance with a method aspect of the invention, a digital check image distribution and processing system is provided, the system having communication nodes located at an image capture site of the archive system and at one or more remote archive retrieval sites. These sites form a communications network that operates as a chained client/server network composed of workstation components and a capture site host computer component. The method enables an originating remote workstation to retrieve a digital document image from the image capture site by first creating at the originating remote workstation a "transaction file" that identifies a digital document image to be retrieved and a transaction file priority. Transaction files are batched by priority at server workstations. The batched transaction files are then transmitted to the capture site workstation. The host then retrieves a group of digital document images from either on-line or archive storage that are identified by the transaction file. The host then sends the group of digital document images to the capture site server workstation, whereupon the group of digital document images are sent from the capture site server workstation to the remote server workstation. The group of digital document images may then be processed by the original requesting client workstation. Processing may include, but is not limited to, a display of each requested image.

These and other features, objects and advantages of the invention will be apparent to those of skill in the art upon reference to the following detailed description, which description makes reference to the drawing.

BRIEF DESCRIPTION OF THE DRAWING

FIGS. 2, 2A and 2B shows the system topology of the image archive and distribution system of FIG. 1 that includes the image distribution system in accordance with the invention.

FIGS. 3, 3A and 3B are an illustration of the software and communication elements of the image distribution system of FIGS. 1 and 2.

FIGS. 4, 4A and 4B are a step by step illustration of the data flow for image data requests and replies within the image distribution system of FIGS. 1 and 2, which data flow 5 utilize transaction files and client server communication nodes in accordance with the invention.

FIGS. 9 through 14 provide a tabular description of the functional content and usage of the transaction files that are utilized in the data flow of FIG. 4.

DETAILED DESCRIPTION OF THE INVENTION

Figure 1:
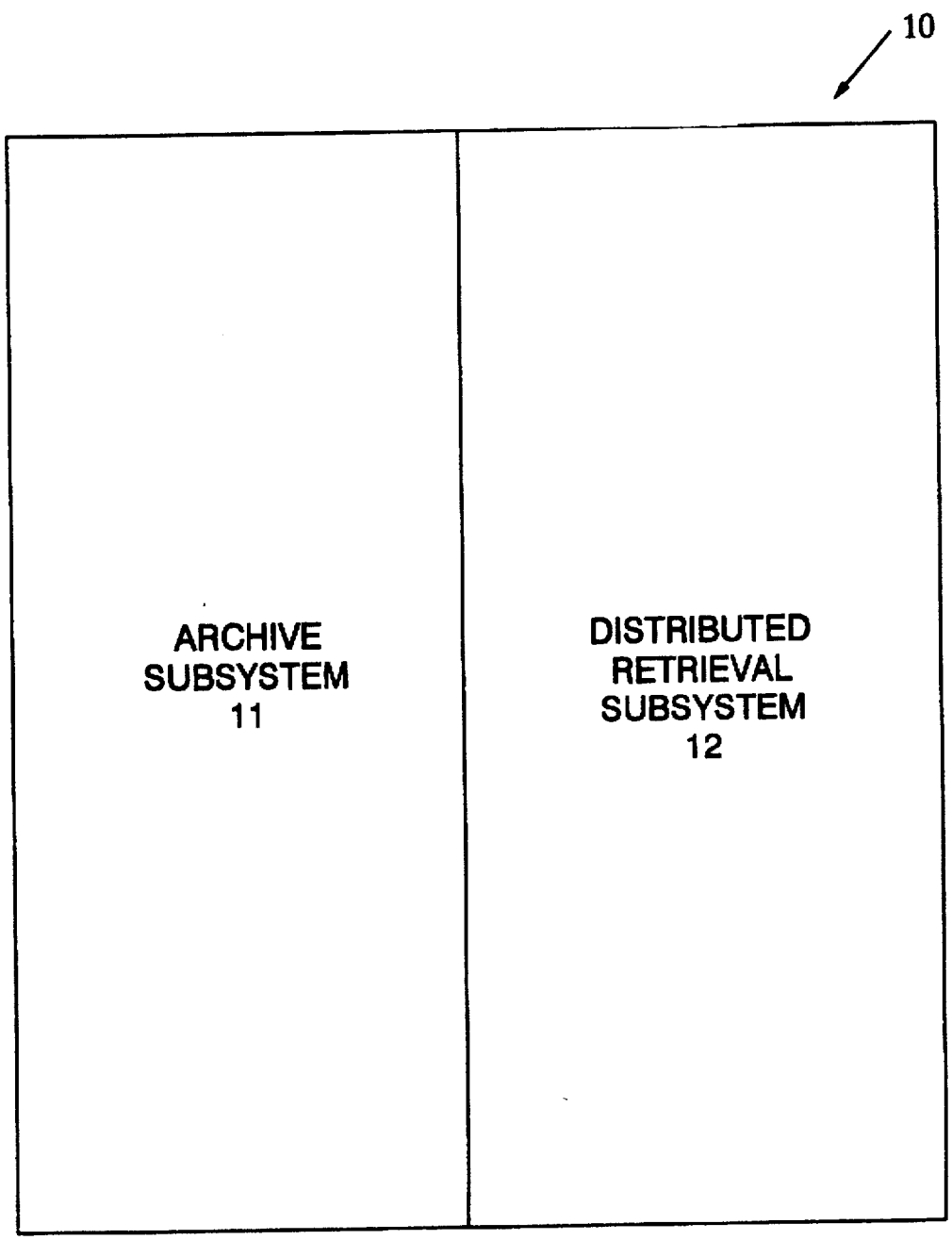
FIG. 1 shows the general configuration of an image archive and distribution system that includes an image distribution system in accordance with the invention.

The present invention relates to an image distribution system that forms a portion of a larger image archive and distribution system. FIG. 1 discloses the general configuration of such an archive/distribution subsystem 10.

The present invention generally deals with features of the image distribution subsystem 12.

Figure 2B:
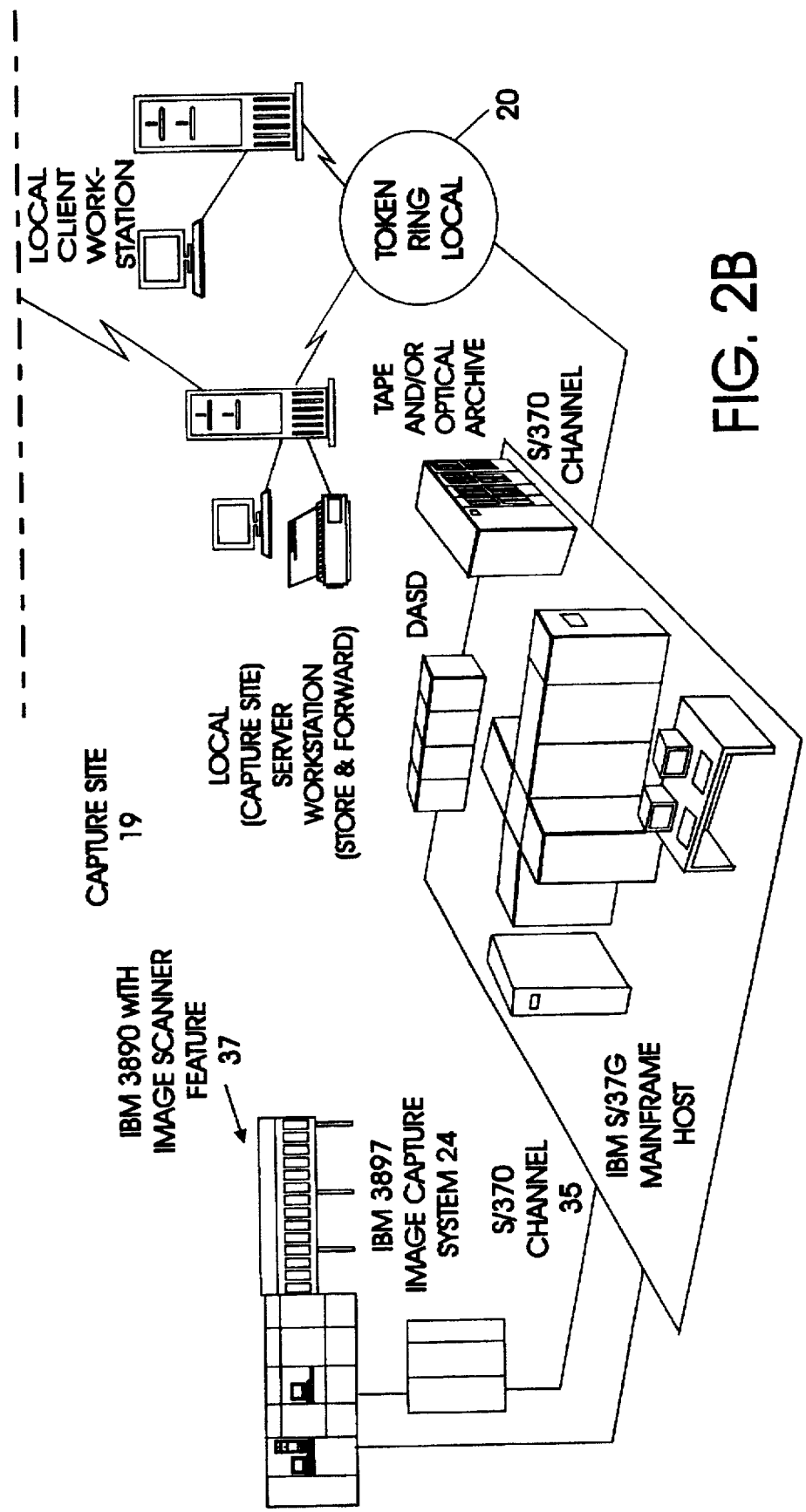

FIG. 2 provides a topology showing of archive/distribution system 10 of FIG. 1. FIG. 2 includes a Wide Area Network (WAN) communication network 15 whose architecture is not critical to the invention. Network 15 communicates with a token ring network 16 that is located to serve a remote site A, with a remote site 18, and with a capture site 19 having a local token ring network 20. FIG. 2 is intended to be a non-limiting representation, and may in fact comprise multiple configurations of this general type, such configurations having for example multiple capture sites, multiple local and remote server workstations, and multiple local and remote client workstations.

Archival storage generally comprises the digital storage of image data, coded data and associated data that relates to a given document or check, herein defined as Archived Document Data (ADD).

Archive subsystem 11 of FIG. 1 is located at capture site 19 of FIG. 2. Archive subsystem 11 is responsible for the capture, evaluation, and long term storage of ADD, these functions being performed in a manner to optimize cost, processing efficiency, and image quality. Thus archive subsystem 11 operates to capture, quality assure, and store ADD so that the ADD can be easily, cheaply, and reliably found in later years.

In general terms, archive subsystem 11 is constructed and arranged to automatically block many individual ADDs into a large ADD group for efficient storage on a variety of media including magnetic disks, magnetic tape libraries and optical disks. Archival subsystem 11 in FIG. 1 includes a suspect image/document processing function that automatically evaluates suspect images/documents, ranks the suspect images/documents by their degree of suspiciousness, allows high speed human review of suspect images/documents, and accumulates data and reports image quality statistics for the individual suspect images of a document, for the entire document, and for a unit of work (UofW) comprising a number of documents.

The architecture and process of image distribution subsystem 12 of FIG. 1 allows the distributed community of workstation users shown FIG. 2 to retrieve and manipulate ADDs with performance characteristics that are matched to the underlying communications network shown in FIG. 2. Both archive subsystem 11 and image distribution subsystem 12 are built on a software base that is commercially well known as the IBM High Performance Transaction System (HPTS).

Image distribution subsystem 12 has components that are located throughout the communications network that is shown in FIG. 2, for example at capture site 19 and at one or more remote archive retrieval processing locations such as remote site A and remote site B. Image distribution subsystem 12 provides both local and remote workstation operators efficient access to any ADD, or portion of an ADD, that is stored by virtue of operation of archive subsystem 11. In addition, image distribution subsystem 12 is designed to support unattended batch (i.e. overnight) or real time retrieval of ADD from archive subsystem 11. Retrieved data is automatically unblocked and routed to a hardfile cache at the requesting operator's workstation or at the requesting server workstation.

Both capture site and distributed site workstations provide image distribution and processing functions via an HPTS application known commercially as High Speed Image Browse (HSIB) and described herein and in the above mentioned related patent application entitled "Method and System for Retrieving and Presenting Stored Digital Images". Via HSIB these workstations are capable of performing image manipulation, high speed paging through images, image enabling of an existing 3270 applications (as described in the above-mentioned application), import and export of images in a variety of formats, print and FAX of images, and a variety of other functions.

In a preferred embodiment, by without limitation thereto, image distribution subsystem 12 was architectured as a chained client-server network consisting of workstations running HSIB and the MVS/ESA host HSIB component. As a result, retrieval requests originate at one HSIB workstation in the retrieval network and flow up the retrieval chain for subsequent servicing. Reply data flows in the reverse direction back to the requesting workstation. This chained client-server distributed retrieval system operation can be represented as follows:

Remote end-user workstation (client)<-> Remote LAN Server workstation (client/server)<-> Capture Site workstation (client/server)<-> Capture Site Host (server).

As shown in FIG. 3, the chained client-server components of image distribution retrieval subsystem 12 comprise (1) remote HSIB workstations, (2) a capture site HSIB workstation, and (3) capture site ESA host programs.

Figure 5:
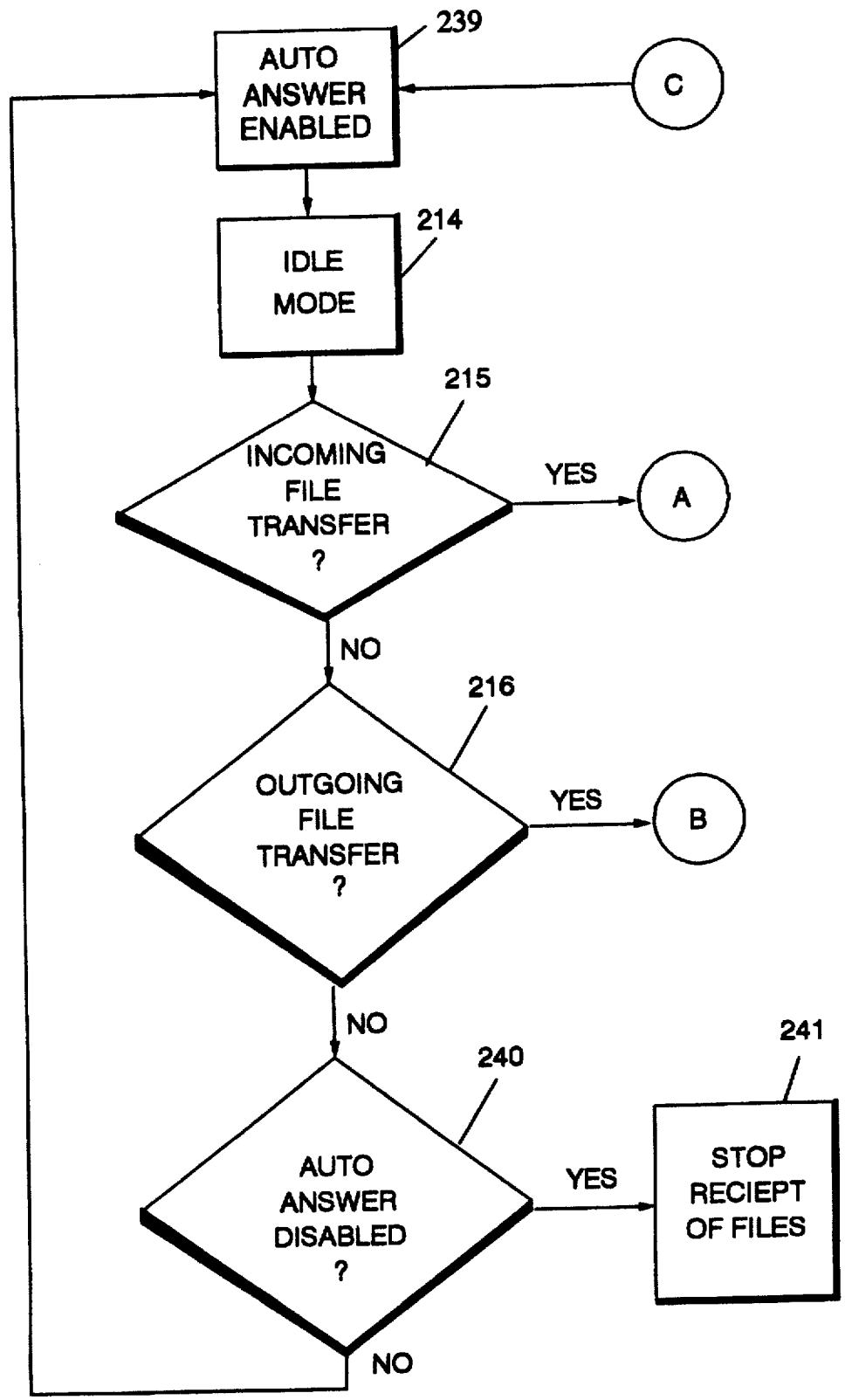
FIGS. 5, 6, and 7 disclose an automated OS/2 to OS/2 file transfer process or program in accordance with the invention.
Figure 6:
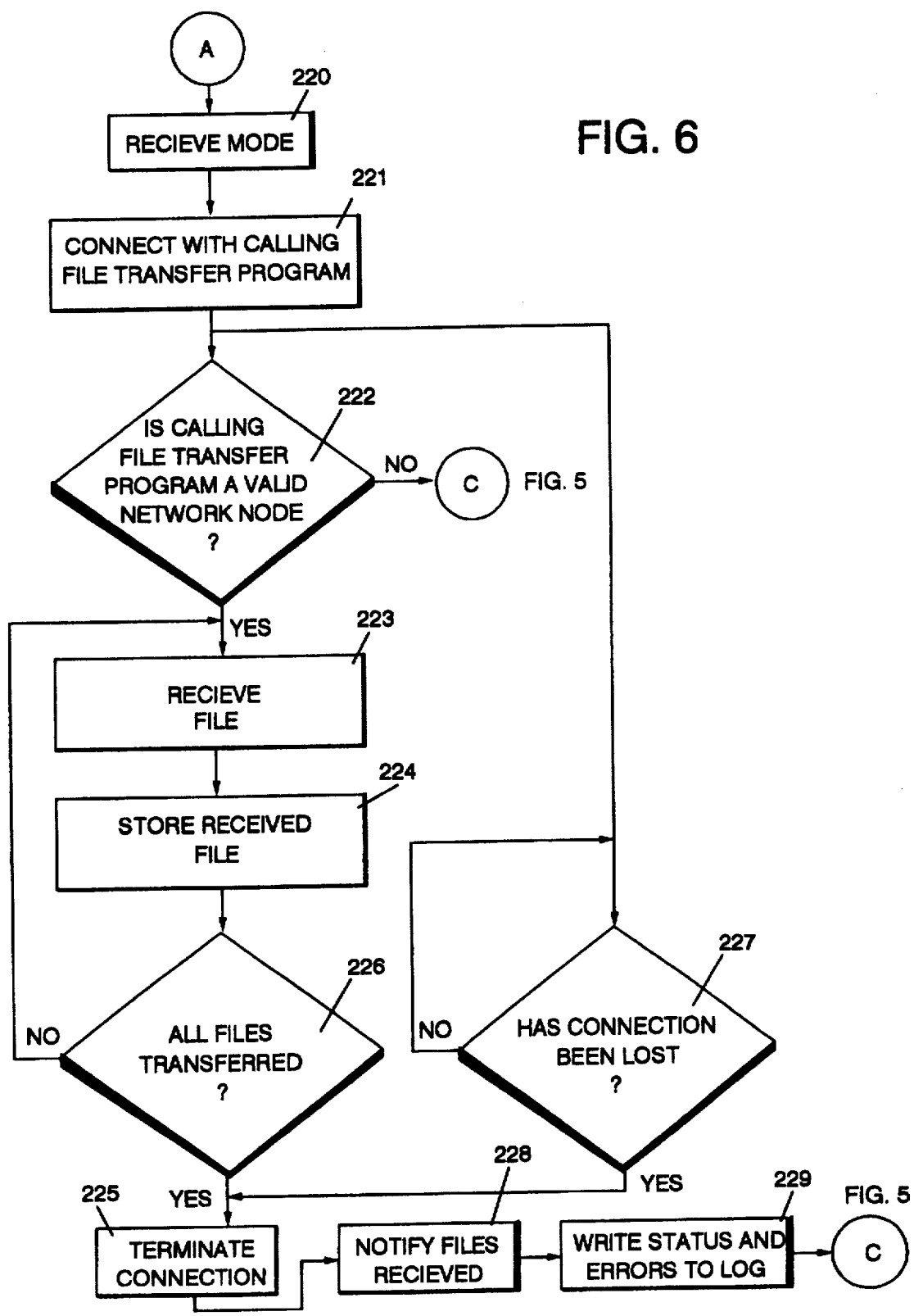
Figure 7:
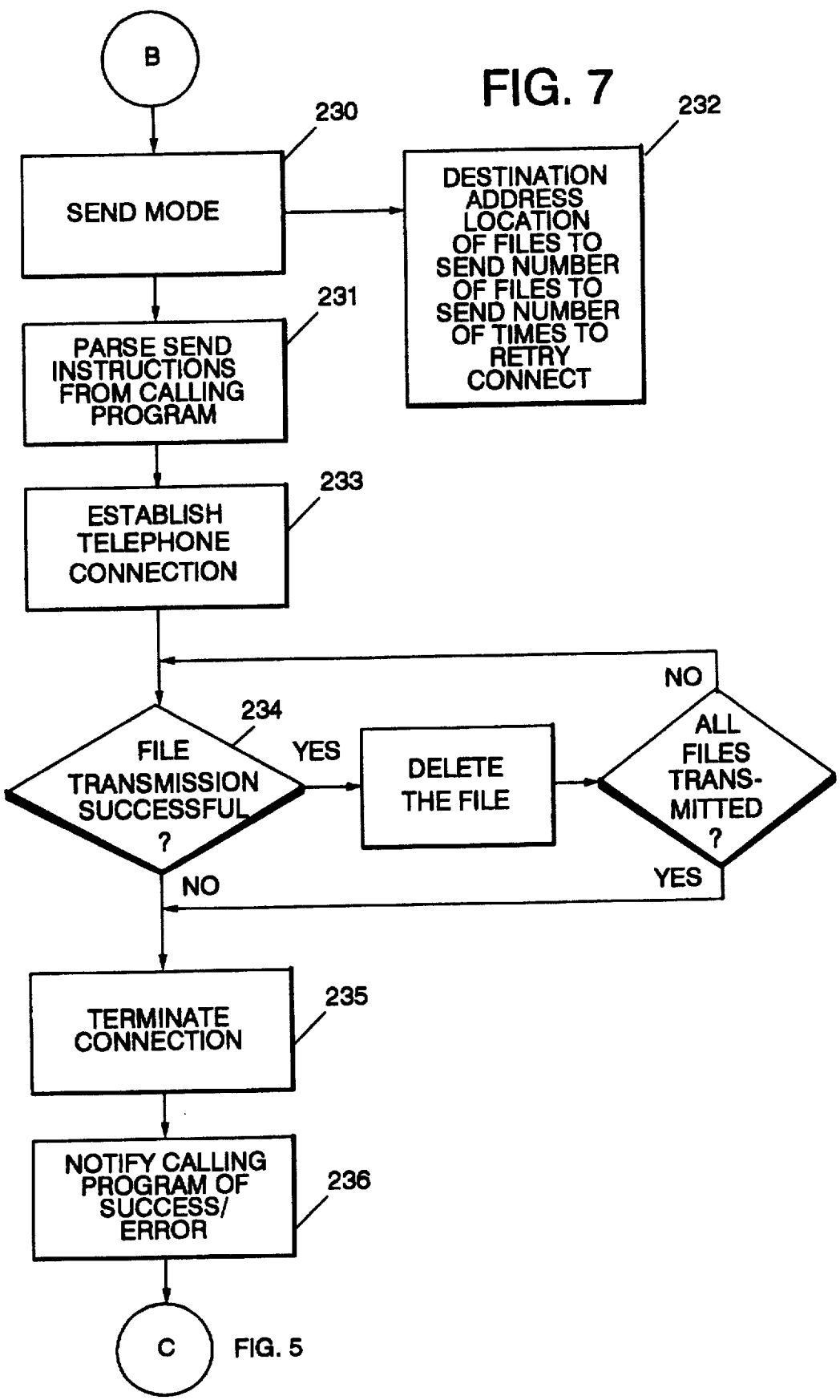

All FIG. 3 workstations include an OS/2 based File Transfer Program to be described relative to FIGS. 5, 6 and 7.

The first chained-client server components, i.e., remote HSIB workstations, includes;

(1) remote LAN connected HSIB workstations which incorporate the HSIB end user functions and typically originate image data requests, thus architecturally these workstations are clients in the client-server chain, (2) remote LAN server HSIB workstations that also include all end user functions, but are primarily intended to perform a batching of request and reply data that originates and ends at the LAN connected workstations. HSIB in these workstations is configured to take advantage of the concurrently running OS/2 LAN Server software. These workstations also perform a WAN communication function for all of the LAN connected workstations. Architecturally these workstations provide server functions for LAN connected HSIB clients, and in turn these workstations request client services from the capture site HSIB workstations, and (3) remote stand alone (i.e. non-LAN) HSIB workstations that combine the functions of the two above mentioned HSIB workstation types. Because these workstations operate in a stand alone environment, these workstations perform all end user functions as well as all functions of the above mentioned remote HSIB server workstation, but without requiring the presence of OS/2 LAN server software.

The second chained-client server component, i.e. the capture site HSIB workstation, can perform all of the end user functions of the above mentioned remote HSIB workstations, but without the delays associated with requests and data flowing up and down the chained client server components. In addition, the capture site HSIB workstation provides store-and-forward functions for requests and reply data from and to remote workstations. Thus this workstation performs server functions for remote HSIB clients, and in turn requests client services from a host HSIB that is a portion of the capture site HSIB host programs chained-client server component.

The third chained-client server component, i.e. the capture site ESA host programs, include the following;

(1) a host HSIB program component that provides host services for the capture site HSIB workstation, and through this capture site HSIB workstation, the Host HSIB provides host services for the entire image distribution subsystem 12.

(2) a Check Image Management System (CIMS) program that is the DASD image database component of HPTS. The above mentioned Host HSIB program component can optionally be configured to first look for requested ADD on CIMS DASD. If the Host HSIB program component is configured in this manner, Host HSIB will ask IACF (to be described) for ADD not found on CIMS DASD.

(3) an Image Archive Consolidation Facility (IACF) operating in its retrieval mode that Host HSIB invokes during the retrieval process. IACF operates in its retrieval mode to manage the identification, retrieval, and unblocking of ADD that is retrieved from archival storage. IACF locates the requested data by managing a multi-level hierarchical storage index as described in the above mentioned related application entitled "Method and System for Retrieving and Presenting Stored Digital Images". IACF unblocks the data returned from archival storage and extracts the requested ADD portion, and finally returns this extracted data to Host HSIB, and (4) an Object Access Method (OAM) program, described in the above mentioned related application entitled "High Volume Document Image Archive System and Method", manages the physical storage devices (i.e. optical disk drives, DASD, magnetic tapes) in a manner that is transparent to IACF.

The fourth chained-client server component, i.e. the OS/2 based File Transfer Program to be described relative to FIGS. 5–7 provides a cost effective and efficient means of automatically, i.e. unattended, communicating information between remote HSIB workstations and the capture site HSIB workstation. This program is the means by which requests are initiated, and ADD or portions thereof are sent in response to these requests. The program interfaces of this OS/2 based File Transfer Program are independent of the underlying WAN communications carrier.

Figure 4A:
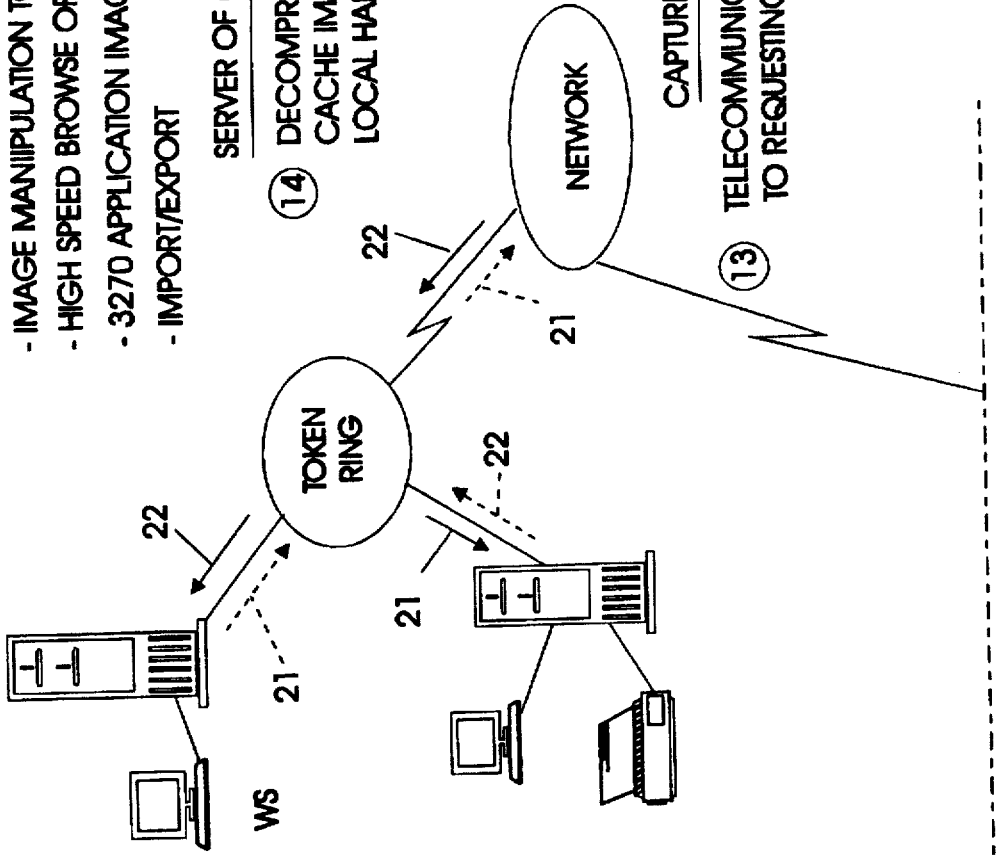

FIG. 4 is a step by step illustration of this chained client-server flow of image data requests and replies within the image distribution subsystem of FIGS. 1 and 2. In this figure the arrows that are numbered 21 designate the flow of an image data request, and the arrows that are numbered 22 designate the flow of the image data that results from the image data request. In step 1 of FIG. 4, a remote originating workstation (WS) creates a transaction file (TF) for the image data request. This originating TF may include items such as the priority of the TF, its file type, its document identifiers, options per document, and the identification of the originating WS and operator.

At step 2, this TF is sent from the originating WS to a remote server WS. At step 3 the server WS accumulates the received TFs, and batches the TFs by the priority specified by the originating WSs assigned in step 1.

At step 4, the server WS telecommunicates the batched TFs to the local (capture site) server workstation of FIG. 2 via the WAN network of FIG. 2, and using the file transfer process or program shown in FIGS. 5, 6 and 7.

At step 5, the capture site WS receives the TF requests, buffers the requests, and sends the requests to the capture site HSIB host of FIG. 3. In step 6, the host HSIB of FIG. 3 parses the TF and requests data from the host CIMS and/or IACF. In step 7 the host IACF requests fetching of the ADD group that contains the requested image, and in step 8 the host OAM retrieves this ADD group from archive media, which is identified in FIG. 4 as optical disk storage, magnetic tape storage, and/or DASD storage.

Step 8 completes the flow of the image data request that originated in step 1 at the remote originating WS. In step 9 the reply flow 22 begins as OAM sends the fetched ADD group to IACF. In step 10 IACF unbundles this ADD group to secure the requested ADD, and then IACF sends this image data to the host HSIB. In step 11 the host HSIB packages the image data, and then sends the image data to the capture site server WS.

Step 12 shows that the capture site WS receives this image data from host HSIB and stores the image data on the workstation hard drive. In step 13 the capture site WS telecommunicates the image data to the network, and then to the remote server WS, whereas in step 14 the data is decompressed, scaled and then stored on workstation hard drive.

Step 15 completes the image data flow of FIG. 4 as the remote server WS manipulates the requested image data, perhaps by way of a high speed image browse function.

In order to allow the image distribution subsystem to be used with any communications carrier and protocol, the system is designed so that all WAN communication is via the file transfer procedure or program shown in FIGS. 5, 6 and 7. This file transfer procedure applies to both image requests, via transaction files, from requesting workstations within the image distribution system of FIGS. 2 and 3 and to the resulting replies that are sent to the requesting workstations in response to the requests. Transferring all information via files provides advantages in terms of simplicity, error recovery, and cost, and in addition allows relatively simple interfacing with almost any communications system.

The procedure, method of file transfer program defined in FIGS. 5, 6 and 7 allows the workstation nodes of distribution subsystem 12 of FIG. 1 to transfer files automatically across a WAN. This embodiment supports OS/2 machine to OS/2 machine background file transfer completely under program control, i.e. without human intervention. In addition, the program has interfaces that are independent of the underlying WAN physical and logical protocols, i.e. the nature of the WAN is known only to the file transfer program and is unknown to the rest of the system. In addition, the program is capable of being used with switched dial-up lines, i.e. with the lowest common denominator of a WAN having a single, standard, direct, common carrier, switched line.

The file transfer program of FIGS. 5, 6 and 7 operates automatically under the control of a calling program which invokes the send mode of FIG. 7. This file transfer program has an additional program interface with a file processing program which is invoked following the receive mode of FIG. 6. These program interfaces are independent of the underlying WAN. This allows the specific file transfer program to be changed to accommodate different WANs without requiring any change to the rest of the system.

The file transfer program of FIGS. 5, 6 and 7 provides the major functions of (1) initiating file transfer via the file transfer program, (2) specifying which files are to be transferred, (3) notifying the calling program of file transfer completion, status and any errors, (4) notifying the receiving file processing program of files awaiting processing, and (5) inhibiting the receive mode of FIG. 6 whenever necessary (e.g., in the event of a "disk full" condition).

The file transfer program is started by the HSIB workstation program. If no errors occured during program startup, the program is put in an idle auto-answer mode. As shown in FIG. 5, the file transfer program in the idle mode 214 loops, at a low priority, in the OS/2 background, waiting for one of three events 215,216,240 to occur. Considering event 215, when the WAN signals an incoming file transfer at 215, the file transfer program switches to the receive mode shown in FIG. 6. When a signal 216 is received from the calling program indicating that outgoing file transfer is to commence, the file transfer program switches to the send mode shown in FIG. 7. Event 240 occurs when no files should be received as in the event the disk storage limit has been reached. This will be described later in this application.

With reference to FIG. 6, the receive mode is shown at 220, whereupon the file transfer program automatically connects with the calling file transfer program as indicated at 221. A dialog 222 is then initiated to assure that the calling file transfer program is a valid network node. If not, then the file transfer program returns to idle mode 214 of FIG. 5.

If a valid network node connection is established at 222, the transmitted file is received as indicated at 223. The file is received as binary data and can be of any size. Automatic detection and recovery is provided from communications line errors, and automatic retransmission of interrupted or erroneous files or file segments is provided.

At 224 the received file is stored on disk in a directory that has been designated by the calling file transfer program. At 225 the communication connection of 221 is terminated, as by phone hangup, when the file transfer program indicates at 226 that all files have been received for this connection. One or more files can be transferred during a single connection. The file transfer program also initiates termination of connection 221 if it detects at 227 that communication connection 221 has been lost.

At 228 the file transfer program notifies the calling program that files have been received, whereupon the file transfer program writes status and error information, if any, to a disk log as indicated at 229. The file transfer program then returns to idle mode 214 of FIG. 5.

The file receive mode of FIG. 6 returns to 239 in FIG. 5 and puts the workstation modem in automatic answer mode.

With reference to FIG. 7, the send mode is shown at 230, whereupon the file transfer program operates to parse the send instructions 232 that are received from the calling program, as is indicated at 231. This information includes the destination phone number address, the storage location of the files to be sent, the number of files to be sent, and the number of times to retry in the event of sending failure, as indicated at 232. The sending of a file(s) is initiated by the calling program in response to a number of criteria including but not limited to, operator request, at a preset time, and when a preset number of files are waiting to be sent or transferred.

Once parse step 231 is completed, step 233 establishes a communication connection over the WAN with receive mode 220 of the receiving file transfer program that is specified by the destination address at 232. Procedure 233 includes initializing the modem of the sending workstation, dialing the outgoing call phone number contained in 232, establishing a connection with the receiving modem, and establishing a connection with the receiving file transfer program.

Once connection 233 is established, a file specified at 232 is transmitted. If successfully transmitted as indicated by the File Transfer Program, the file is deleted. Connection 233 is terminated at 235, as by hanging up the phone, when the File Transfer Program indicates at 238 that all files to be transferred have been transferred. The calling program is notified of the successful transmission, or of any errors, as indicated at 236, whereupon the file transfer program returns to 239 of FIG. 5.

The file transfer program of FIGS. 5, 6 and 7 is installed on every telecommunications network workstation, capture site 19 shown in FIG. 1, the LAN server workstation(s), and on the non-LAN connected (i.e. stand-alone) workstations.

As shown in FIG. 5, the file transfer program of FIGS. 5, 6 and 7 loops constantly in OS/2 background waiting for one of three events to occur, (1) the telephone to ring indicating an incoming file transfer as at 215, (2) notification from HSIB indicating that outgoing file transfer 216 is to begin, or (3) an indication at 240 that auto answer is to be disabled. This later function 240 provides a means whereby HSIB can stop the receipt of files when the disk storage limit has been reached, as is indicated at 241. Automatic auto-answer enabling is restarted by 239 when storage utilization drops below this limit.

At any given time, it is possible that one or more of the workstations in the chained network could exceed its disk storage capacity as retrieval requests and reply data flow through the chained network. In order to prevent possible loss of data from such a disk full situation, the present invention provides a disk full handling means as is shown in FIG. 8.

Figure 8:
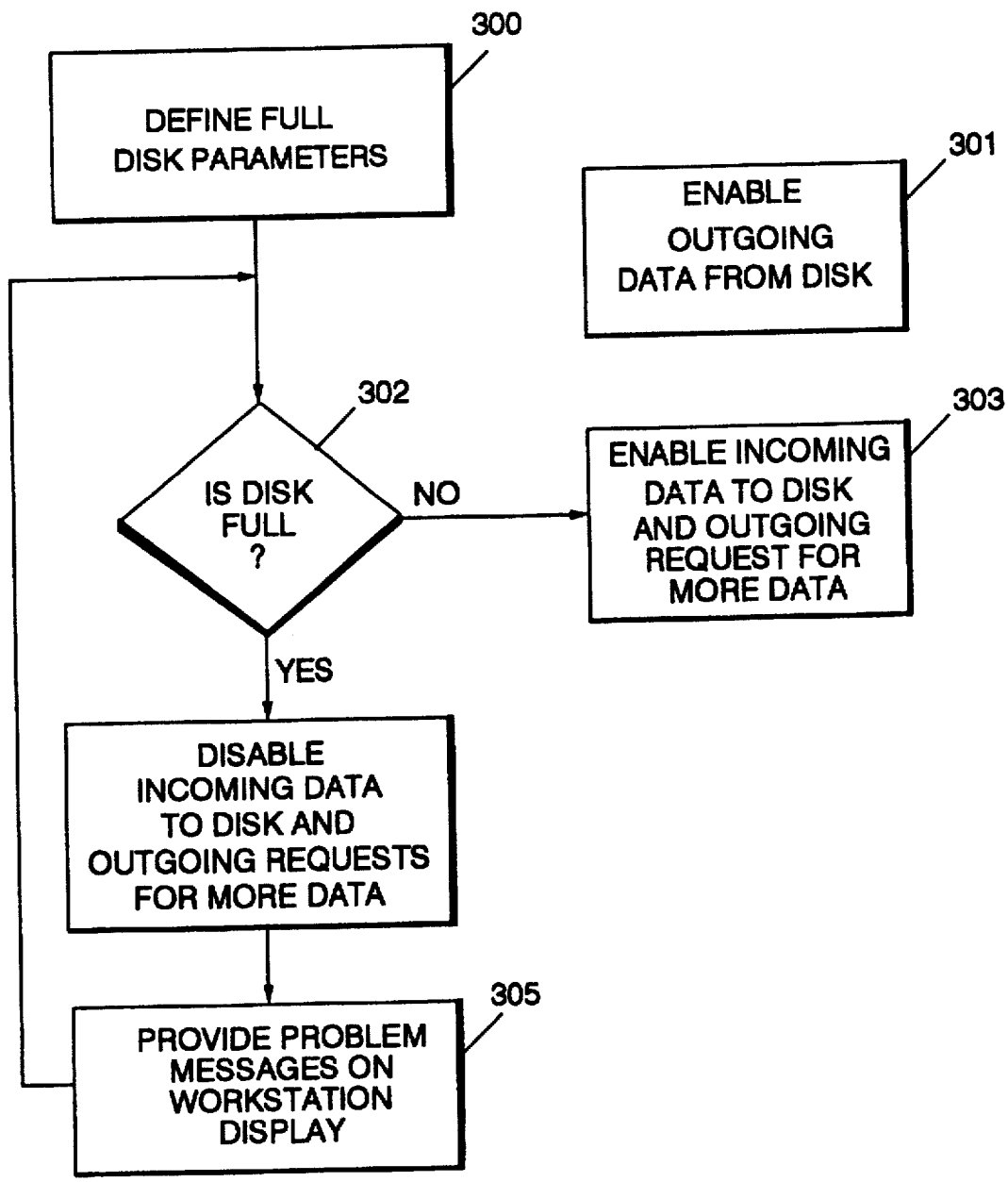
FIG. 8 discloses an automated disk full handling technique of the invention.

The construction and arrangement of FIG. 8 allows a workstation user to define parameters by which a disk full condition will be determined, this being indicated at 300. Independent of the state of the workstation's disk storage, outgoing data from the work station will at all times be enabled, this being indicated at 301.

At function block 302 the state of fullness of the workstation's disk storage is monitored. So long as the disk(s) is not full, incoming data to the workstation is enabled, as at 303. When it is sensed that the disk(s) is full, incoming data to the workstation and outgoing requests are disabled as at 304. At function block 305 problem messages are provided to the workstation operator by way of the workstation's display.

This disk full condition is reset when decision block 302 determines that the workstation disk(s) is no longer full.

As is apparent from the above discussion of FIG. 4, the chained client-server network of distribution subsystem 12 provides both local and remote operators efficient access to any document image and/or image related data (i.e. any ADD, or any portion thereof) that has been archival stored by operation of archive subsystem 11.

In order for all components, including host and workstation components, of a image distribution subsystem 12 to communicate in a manner that supports the requirements of a chained client-server network, in a manner that is independent of the underlying WAN and LAN physical and logical protocols, and in a manner that is capable of being used with a switched line WAN, the invention provides a new and unusual image request and tracking protocol.

This protocol comprises a file structure known as a transaction file (TF) that encodes information relating to ADD requests.

Unless otherwise noted, the term ADD denotes both actual images of a document (i.e. bit maps), and any coded data that is associated with the document image or images (e.g., the Magnetic Ink Characters, MICR, from the bottom of a check). The ADD may also contain any arbitrary digital data (e.g., coded data, image data, digitized voice) inserted by the system's users. The system allows such arbitrary data to be stored, tracked, and retrieved, without being "aware" of it's significance or content. The individual document whose image and coded data (at least) are contained within an ADD is identified by a unique document identifier (DI).

As explained relative to FIG. 4, a TF is created at the requesting or originating WS. This TF is the mechanism by which the various components shown in FIG. 4 track and update information relating to the status of ADD data, as requests and replies flow through image archive and distribution system 10 in the manner shown in FIG. 4.

A new TF is created in a number of ways. FIG. 4 shows the creation of a new TF as a result of the semi-automatic 3270 screen capture of either an individual DI, or the capture of a group of DIs on a single screen via techniques generally referred to in the art as "screen scrape". A new TF can also be created as a result of an operator's manual request for image data associated with either an individual DI, or a group of DIs that are specified in a list of DIs provided by the user.

A TF specifies the characteristics that are associated with the transaction, the characteristics associated with the CPCS (see the ESA host of FIG. 3) UofW (a UofW comprises a relatively large number of individual ADDs) that is being requested as a result of the TF, and the characteristics that are associated with the image data for each DI. A summary of this aspect of a TF is shown in FIGS. 9–14, comprising a tabular description of the functional content and usage of TFs.

At transaction initiation, i.e. at step 1 of FIG. 4, if certain TF characteristics are not operator specified, default values are provided for all such unspecified TF characteristics, with the exception of the DIs being requested by the TF.

The file fields or characteristics that are associated with the TF as a whole are:

(1) A unique TF identifier, originating time stamp, and the byte size of the TF. These TF fields are created at the time of origin of the TE, and remain unchanged for the life of the TF.

(2) An identifier of the originating operator, WS, and LAN. These TF fields are created at the time of origin of the TF, and remain unchanged for the life of the TF.

(3) The type of transaction requested, i.e. an image data request, a status request, or a suspect image review request. These TF fields are created at the time of origin of the TF, and remain unchanged for the life of the TF.

(4) The current transaction status of the transaction request as a whole. This field is updated by each component of FIG. 4 as that component acts on the TF.

(5) The priority of the transaction request, i.e. either batch or immediate priority. This TF field is created at the time of origin of the TF, and remains unchanged for the life of the TF.

(6) Image scaling, if any, that is to be performed on images prior to display of the images. This TF field is created at the time of origin of the TF, and remains unchanged for the life of the TF.

(7) A selection of whether or not image decompression/scaling is to be done by the 3898 Image Processor or via an HSIB WS. This TF field is created at the time of origin of the TF, and remains unchanged for the life of the TF.

(8) If image decompression/scaling is to be done, a selection of whether it is to be done immediately upon receipt of the image by a WS, or when a display of the image is requested. This TF field is created at the time of origin of the TF, and remains unchanged for the life of the TF.

The TF characteristics that are associated with a UofW, if any, are:

(1) A CPCS UofW or string identifier (ID) for each UofW. These IDs can be specified at transaction initiation time, step 1 of FIG. 4, or later by the host HSIB, step 6 of FIG. 4. However, once specified, this TF field remains unchanged for the life of the TF.

(2) An image quality analysis recommendation for each UofW, i.e. either reject or conditionally accept.

(3) Information that is necessary to support suspect image selection and display at the capture site WS of FIGS. 2 and 4, including the total number of documents captured for or contained in this UofW, the number of suspect documents in this UofW, the DIs of the suspect documents, and the sequence in which the documents of DIs are to be presented. These TF fields are supplied by the host HSIB in step 11 of FIG. 4.

The TF characteristics that are associated with documents, if any, are:

(1) A DI for each document for which image data and/or status information is requested or supplied. These TF fields are created at the time of origin of the TF, and remain unchanged for the life of the TF.

(2) A 44 byte CIMS image key for each document's image data. These CIMS image keys are supplied either by the origination WS at step 1 of FIG. 4, or via at the host at step 6 of FIG. 4.

(3) A WS file location path and filename for each set of document data. This TF field is created by the WS that stores the image data, for example at step 15 of FIG. 4.

(4) A DI type, that is,
  (a) an explicitly requested DI,
  (b) an implicitly requested forward DI that is one of a number of consecutive forward documents for which the same information is requested,
  (c) an implicitly requested backward DI that is one of a number of consecutive backward documents for which the same information is requested, This TF field is created at transaction time and remains unchanged for the life of the TF.

(5) The current document status for each document requested by the TF.

(6) The document suspiciousness value, if any. This TF field is created by the image quality analysis (IQA) function at the host of FIG. 3, during scanning of a document and subsequent processing of the document image(s).

The TF characteristics that are associated with image data, if any, for all documents that are specified in the TF are:

(1) The image data requested for a document, i.e. front black/white image (FBW), front gray scale image (FGS), back gray scale (BGS), back black/white image (BBW), CIMS segment 0 coded data, any auxiliary user data that is provided during scanning of the document.

(2) The image suspiciousness values, if any, for all of the above listed image views. This TF field is created by the image quality analysis (IQA) function at the host of FIG. 3, during scanning of a document and subsequent processing of the document image(s).

A TF can be originated at any WS of FIGS. 2 and 3. This originating WS specifies a batch or an immediate priority for the TF. Immediate priority TFs are immediately made available to the file transfer program of FIGS. 5, 6 and 7, with instructions to transmit these TFs immediately to the capture site WS shown in FIGS. 2 and 3.

Batch priority TFs are collected by a server WS as at step 3 of FIG. 4. When a predetermined set of conditions are met, these batched TFs are transferred to the capture site WS, as in step 5 of FIG. 4, via the file transfer program shown in FIGS. 5, 6 and 7.

As is apparent from the above description, the file oriented image request and tracking protocol of the invention is a general purpose protocol for image data requests and data flow tracking that has particular utility in a geographically distributed system, the protocol providing a specific syntax. In addition, the protocol is file oriented, rather than conversational, and the same is usable by virtually any host application process and any workstation process, in virtually any operating environment, and can be carried by virtually any higher level communications protocol. The request structure of the protocol tracks the status of the request processing through the distribution subsystem. A transaction filename uniqueness algorithm is provided. The protocol is extendable, and provides a simple interface to other applications.

The image processing step 15 shown in FIG. 4 provides the network workstations with a high speed image browse function enabling workstation operators to retrieve document images and to then perform various functions relative thereto. FIGS. 15 and 16 taken from above mentioned related patent application entitled "Method and System for Retrieving and Presenting Stored Digital Images" disclose the operation of this application's document image browse feature. As shown in FIG. 3, each of the remote image workstations, and the capture site image workstation as well, include presentation manager and high speed image browse (HSIB) features. These workstation features enable the image retrieval and manipulation operations disclosed in FIGS. 15 and 16.

When an operator initiates a display request for a document image, all image views that are available on that workstation's hard drive are loaded into that workstation's working memory. In addition, all associated images, i.e. images of consecutive/previous documents, are loaded into working memory from that workstation's storage memory. This operation allows very fast paging through these associated document images using the workstation's personal computer keyboard and/or mouse and display.

Operator document requests for a set of documents associated with a specific TF causes the first few images associated with the first few documents in the TF to be loaded into workstation working memory. Once the operator begins paging through the TF, HSIB looks ahead and loads and unloads document images from working memory so that at least the next document of the TF and the previous document of the TF are always memory resident.

When the operator requests a document for which there are no associated images locally available, HSIB displays a message informing the operator that the document to be displayed is not available locally, and the operator is given a choice as to (1) displaying the remaining images of the associated TF that may be locally available, (2) requesting that the images of the associated TF be obtained from archive storage at capture site archive storage, following the procedure of FIG. 4, or (3) cancelling the document request.

Once document images are available at a workstation for paging, the operator may page through the alternate images of a given document, or the operator can page through the next and previous consecutive document images in the TF.

The workstations, using the HSIB function, can both export images and import images, in a variety of formats, to and from other workstation programs. For example images can be exported to a word processing program for inclusion in a document composed by that program. Imported images are associated with TFs and are processed identically to images that are received from the capture site's archival storage.

In addition, HSIB supports requests for status information about specified TFs. A local status request will supply the last known processing information about a transaction file at the requesting workstation, whereas a system status request, which is valid only if received from a remote site workstation, will supply the last known processing information about a TF at the host capture site workstation. For example, a reply to a system status request might indicate that the image request has been received at the host site and reply is pending awaiting a tape mount by an operator.

As workstations process document images and TFs, local workstation storage often may require cleanup. HSIB warns the operator by way of a display message that cleanup is required when the available local storage falls below a given threshold. This cleanup warning remains displayed as long as storage utilization is above a given threshold. At the operator's option, this cleanup may be to erase a specific TF and all image data associated with only that TF, or to erase all TFs prior to a specific date and all image data associated with only those TFs. As a safeguard, a workstation operator may erase only those TFs and uniquely associated images that the operator uniquely requested, the exception being that an operator supervisor may erase any TF and uniquely associated images.

In addition to the above, the capture site workstation of FIG. 3 is configured to perform a number of additional functions. The capture site workstation can receive TFs from a remote site workstation via the file transfer program or process shown in FIGS. 5, 6 and 7 and to transfer these TFs to the host HSIB component. This function includes the ability of the capture site workstation to create its own TFs and to process these TFs as if they had been received from a remote workstation. In addition the capture site workstation can receive reply data and updated TFs from the host HSIB component, i.e. receive data 22 in step 11 of FIG. 4, and then store this data locally at the capture site workstation if it was originally requested by the capture site workstation. Of course, as shown in FIG. 4, the capture site workstation additionally operates to forward reply data along with the associated TF to the requesting remote workstation's HSIB component. All such reply data is deleted from the capture site's storage after successful transmission, via the file transfer process of FIGS. 5, 6 and 7 to the requesting remote workstation.

HSIB allows Suspect Image Review, as described in the above mentioned related patent application entitled "Image Quality Analysis Method and Apparatus". In this process a workstation operator browses through images associated with documents that have been identified as suspect documents by the IBM 3897 image capture system 24 of FIG. 2. Suspect images are always retrieved for review from the host system at the capture site, even when copies thereof are locally available at the workstation's local memory.

At the workstation's display, the operator is presented with a menu that allows the operator to request for review (1) a specific UofW, or (2) the next UofW for which there are one or more suspect documents that have been either rejected or conditionally accepted for archive by the image quality analysis (IQA) function of this related application. When a UofW is available for review, the operator is presented with a list of suspect documents in that UofW, ordered by document suspiciousness value as determined by this IQA function. After review, the operator can decide to either accept or reject the entire UofW for archiving. An accept decision allows the archiving process to continue, whereas a decision to reject disables archiving of the UofW and initiates host based cleanup relative to this UofW.

The capture site workstation HSIB function recovers from situations where communication with the host's HSIB is lost while a TF request is outstanding, i.e. when a TF has been sent by capture site HSIB workstation to host HSIB, but all of the information comprising a complete response by host HSIB has not been as yet received by capture site HSIB. Upon restart, capture site HSIB workstation will give the operator the option to request the transaction file, or to abort the request.

A remote workstation of FIG. 2 that also performs a server function is configured to perform additional functions over and above its function as a remote workstation, such as (1) providing a storage repository for its network connected remote workstations, (2) forwarding TFs to the capture site workstation via the file transfer process of FIGS. 5, 6 and 7, (3) receiving replies and updated TFs via this file transfer process from the capture site workstation and storing these items locally at the server remote workstation, and (4) decompressing and scaling received images, if so requested by the TF, and storing the images locally.

While the HSIB function of the various workstations of FIG. 2 initiates all file transfer activity, actual file transfer send and receive functions are managed by the underlying file transfer function of FIGS. 5, 6 and 7. The interface between HSIB and this file transfer function (1) provides the mechanism whereby file transfer is initiated via this file transfer function (boxes 215 and 216 of FIG. 5), (2) provides a mechanism whereby the files to be transferred can be specified (box 232 of FIG. 7), (3) provides a mechanism whereby the file transfer function can notify HSIB of file transfer completion, status and any error that occurred (box 229 of FIG. 6), (4) provides a mechanism whereby HSIB is notified of files received by the file transfer function (box 228 of FIG. 6), and (5) provides a mechanism whereby HSIB notifies the file transfer function to stop receiving phone calls, i.e. to take the file transfer modem out of the auto answer mode (box 241 of FIG. 5).

HSIB initiates the outgoing file transfer of box 216 of FIG. 5 when (1) the image data to be transferred has an immediate priority, (2) a preset time of day for transmission has expired for a transfer request, (3) the workstation operator has requested that all files be transferred, and (4) the number of item data or TF requests awaiting transfer has exceeded a given threshold.

The host HSIB function of FIG. 3 runs in the check processing control system (CPCS) environment under the 3890/XP MVS on top of the services provided by HPTS ALS IHAS. Host HSIB is automatically started by logon of HPTS by the capture site workstation. The primary function of host HSIB is to manage the retrieval of image data from both CIMS disk storage and archive storage in response to requests received through and from the capture site HSIB workstation. In response to TF requests for image data from HSIB workstations, host HSIB will (1) receive TF requests for image data from the workstations, (2) parse and process TFs serially in the order received, while allowing immediate priority interrupt while processing requests from Archive Storage only, (3) attempt to retrieve requested image data from CIMS storage prior to requesting the same information from archive subsystem 11 of FIG. 1, (4) package the image data received from the image archive consolidation facility (IACF) into suitable form for transmission to the capture site workstation.

The above detailed description of the invention has dealt with preferred embodiments thereof. However since it is apparent that those skilled in the art will visualize yet other embodiments that are within the spirit and scope of this invention, it is lot intended that the above description be taken as a limitation on the invention.

What is claimed is:

1. In a digital document image archive and distribution system including an archive subsystem and a distribution subsystem, said system having communication nodes located at an image capture site of said archive system and at one or more remote archive retrieval sites, said sites forming a communications network operating as a chained client/server network that is composed of workstation components and a capture site host computer component, a method enabling an originating remote workstation to retrieve a digital document image from said image capture site, comprising the steps of:

creating at an originating remote workstation a transaction file that identifies a digital document image to be retrieved and a transaction file priority;

sending said transaction file to a remote server workstation whereat a plurality of transaction files are batched by said priority;

transmitting said batched transaction files to said capture site workstation;

using said host component to retrieve a group of digital document images from said archive storage including said digital document image identified by said transaction file;

using said host to send said group of digital document images to a capture site server workstation;

sending said group of digital document images from said capture site server workstation to said remote server workstation;

sending said group of digital document images from said remote server workstation to said originating remote workstation; and using a workstation visual display to image process said group of digital document images at said originating remote workstation.

2. The method of claim 1 including the step of:

providing a common communication protocol that is operable between said workstations.

3. The method of claim 2 including the steps of:

providing disk storage means at each of said workstations;

providing means sensitive to a disk full condition at said disk storage means at each of said workstations; and providing means to disable receipt of digital document images by a workstation having said disk full condition.

4. A digital communication network constructed and arranged to distribute and manipulate digital document images that are contained in digital archival storage, comprising:

digital archive storage means containing a plurality of captured document images, each image having a unique image identifier;

a plurality of geographically distributed operator workstations connected to form said communication network, each of said workstations being selectively operable as a client workstation or as a server workstation, and each of said workstations including operator display means whereby digital images may be visually viewed and manipulated by an operator;

image request means at a requesting client workstation to originate a transaction file whereby at least one digital image in said archive storage means is defined by an image identifier that is unique to said at least one digital image, said transaction file having a transaction file priority;

first communication means including first server workstations operable to fetch said at least one digital image from said archive storage means, said first communication means operating to batch a plurality of transaction files by transaction file priority;

second communication means including second server workstations operable to send said batched transaction files to said requesting client workstation; and visual display means at said requesting client workstation operable to visually display said fetched at least one digital image.

5. The digital communication network of claim 4 including:

means providing a common communication protocol that is operable between said plurality of workstations.

6. The digital communication network of claim 4 wherein said originated transaction file defines a plurality of digital images to be fetched from said archival storage means, and including:

operator control means at said requesting client workstation enabling an operator to access selected ones of said plurality of digital images for visual review.

7. The digital communication network of claim 4 wherein each of said plurality of workstations includes a disk storage device, and including:

means sensitive to said disk storage device at each of said plurality of workstations operable to disable receipt of fetched digital images in the event that a substantially full disk condition is sensed.

8. The digital communication network of claim 7 wherein said originated transaction file defines a plurality of digital images to be fetched from said archival storage means, and including:

operator control means at said requesting client workstation enabling an operator to access and manipulate selected ones of said plurality of digital images.

9. In a digital check image archive and distribution system including an archive system and a distributed digital check image retrieval system, said system having communication nodes located at a check image capture site of said archive system and at one or more remote archive retrieval sites, said sites forming a communications network operating as a chained client/server network that is composed of workstation components and a capture site host computer component, a method enabling an originating remote workstation to retrieve a digital check image from said image capture site, comprising the steps of:

creating at an originating remote workstation a transaction file that identifies a digital check image to be retrieved and a transaction file priority;

sending said transaction file to a remote server workstation whereat a plurality of transaction files are batched by said priority;

transmitting said batched transaction files to said capture site workstation;

using said host component to retrieve a group of digital check images from said archive storage including said digital check image identified by said transaction file;

using said host to send said group of digital check images to a capture site server workstation;

sending said group of digital check images from said capture site server workstation to said remote server workstation;

sending said group of digital check images from said remote server workstation to said originating remote workstation; and using a workstation visual display to image process said group of digital check images at said originating remote workstation.

10. The method of claim 9 including the step of:

providing a common communication protocol that is operable between said workstations.

11. The method of claim 10 including the steps of:

providing disk storage means at each of said workstations;

providing means sensitive to a disk full condition at said disk storage means at each of said workstations; and providing means to disable receipt of digital check images by a workstation having said disk full condition.

12. A digital communication network constructed and arranged to distribute and manipulate digital check images that are contained in digital archival storage, comprising:

digital archive storage means containing a plurality of captured digital check images, each image having a unique image identifier;

a plurality of geographically distributed operator workstations connected to form said communication network, each of said workstations being selectively operable as a client workstation or as a server workstation, and each of said plurality of workstations including operator display means whereby digital check images may be visually viewed and manipulated by an operator;

image request means at a requesting client workstation to originate a transaction file whereby at least one digital check image in said archive storage means is defined by image identifier, said transaction file having a file priority;

first communication means including first server workstations operable to fetch said at least one digital check image from said archive storage means, and operable to batch a plurality of transaction files by file priority;

second communication means including second server workstations operable to send said batched plurality of transaction files, including said fetched at least one digital check image to said requesting client workstation; and visual display means at said requesting client workstation operable to visually display said fetched at least one digital check image.

13. The digital communication network of claim 12 including:

means providing a common communication protocol that is operable between said plurality of workstations.

14. The digital communication network of claim 12 wherein said originated transaction file defines a plurality of digital check images to be fetched from said archival storage means, and including:

operator control means at said requesting client workstation enabling an operator to access selected ones of said plurality of digital check images for visual review.

15. The digital communication network of claim 12 wherein each of said plurality of workstations includes a disk storage device, and including:

means sensitive to said disk storage device at each of said plurality of workstations operable to disable receipt of fetched digital check images in the event that a substantially full disk condition is sensed.

16. The digital communication network of claim 15 wherein said originated transaction file defines a plurality of digital check images to be fetched from said archival storage means, and including:

operator control means at said requesting client workstation enabling an operator to access and manipulate selected ones of said plurality of digital check images.

* * * * *